3,042,670
SELECTIVE REDUCTION OF STEROIDAL DIENONES

Elliot L. Shapiro, Cedar Grove, and Eugene P. Oliveto, Glen Ridge, N.J., assignors to Schering Corporation, Bloomfield, N.J., a corporation of New Jersey
No Drawing. Filed June 13, 1961, Ser. No. 116,675
7 Claims. (Cl. 260—239.55)

This invention in general relates to a novel method for the selective, partial reduction of unsaturation in the A-ring of a steroid having more than one point of unsaturation therein. In its most particular aspect it relates to the preferential reduction of steroidal dienones characterized as having a keto group on the 3-carbon and unsaturation at the 1 and 4 carbons in the A-ring of the nucleus of the compound.

Although methods are presently known for the reduction of steroids containing polyunsaturation in the A-ring thereof such as a 3-keto-$\Delta^{1,4}$ dienone system, none of these can be relied on to exercise a specific and selective total conversion of the 3-keto-$\Delta^4$ monoenone. For instance, reduction of a dienone system of the $\Delta^{1,4}$ type with a metal such as platinum or palladium effects a random conversion of the dienone to yield varying quantities of 3-keto-$\Delta^1$ monoenone, 3-keto-$\Delta^4$ monoenone, 3-keto tetrahydro compounds and unconverted $\Delta^{1,4}$ dienones. While it is possible to separate out the desired 3-keto-$\Delta^4$ monoenone by methods well known to the art such separation is costly, time consuming and impractical from the standpoint of commercial operation.

The instant process, in its chief aspect, provides a ready means for selective saturation of the 1-2-position in the A-ring of the steroid dienone nucleus permitting the unsaturation in the 4 and 5-positions to remain. An important utility thus presented by the present process is the availability of a reliable route for the direct conversion of relatively inactive dienones like 17α-methyl-1,2-dehydrotestosterone and 1,2-dehydrotestosterone to their active monenone counterparts 17α-methyltestosterone and testosterone. Moreover, by the use of our novel A-ring reduction method valuable 3-keto-$\Delta^4$ monoenone intermediates may be obtained which while they themselves may not be highly active compounds have the capacity to be readily substituted, particularly as the 6-position, to afford active alkyl or halogen substituted derivatives which could otherwise not be directly derived from the 1,4-dien-3-one system. An example of this latter use is seen in the transformation of 16α-methyl-17α,20;20,21 - bismethylenedioxy - 1,4 - pregnadiene - 11β - ol-3-one to the 16α-methyl-17α,20;20,21-bismethylenedioxy-4-pregnene-11β-ol-3-one. This latter compound may now be easily and conventionally transformed to the 6-fluoro analog. Regeneration of the dihydroxyacetone sidechain and $\Delta^1$-unsaturation by procedures also known to the art will afford the valuable anti-inflammatory 6α-fluoro-16α-methyl-prednisolone.

In contrast to the above reaction sequence now made available by our novel reduction step prior art attempts to directly substitute the 6-position of the corresponding dienone have been unsuccessful apparently because of the tendency for reaction to occur at various points in the A-ring unsaturated system, i.e., at the 4-position in a 1,4-dienone in preference to the 6-position for example. By the incorporation of our novel reduction step to preliminarily convert the dienone to the monoenone this 6-position substitution difficulty has been overcome.

The reaction which comprises the essence of the present process is conducted by merely treating a steroid typified as having an A-ring $\Delta^{1,4}$ dienone system of unsaturation with a reducing medium comprising an alkali or alkaline earth metal in a suitable solvent. After permitting sufficient time for the reaction to proceed and selective reduction to take place the reducing potential of the medium is destroyed in any conventional manner but preferably by adding a substance such as acetone, ammonium chloride or the like. More particularly the process involves reaction of a $\Delta^{1,4}$ dien-3-one with an electron donating light metal selected from groups IA and IIA of the periodic chart, preferably lithium or calcium but also including sodium, potassium and the like contained in a liquid anhydrous ammonia, or secondary lower aliphatic or cycloaliphatic amine solvent.

The $\Delta^{1,4}$-dien-3-one may be added to the aforesaid reduction medium or the medium may slowly be added to the steroid. In those cases where the steroid is difficultly soluble in the reducing medium an inert organic solvent such as tetrahydrofuran, anhydrous ether and the like may be included. It is essetial that the reducing medium be maintained in an anhydrous condition during the course of the reaction and for this reason any amines which contain hydroxyl functions or solvents which contain hydroxyl functions or are contaminated by water may not be employed.

It is a feature of the present process that those desiring to reduce a steroid possessing a keto group on the 3-carbon for instance and which simultaneously exhibit other points of unsaturation in the A-ring, such as double bonds between carbons 1 and 2 as well as carbons 4 and 5 may now saturate the $\Delta^1$ bond without converting the keto group on the 3-carbon to a hydroxyl group or affecting the 4(5) unsaturation. As an incident of this A-ring reduction of those pregnatrienes having a keto group on the 3 and 20 carbons and unsaturation at the $\Delta^1$, $\Delta^4$ and $\Delta^{16}$ positions in the nucleus, both the $\Delta^1$ and $\Delta^{16}$ bonds may be selectively reduced without affecting in any way the keto groups on either the 3 or 20 carbon atoms.

It is a characteristic of the novel reducing medium that when brought together prior to their contact with the steroid to be reduced the metal-amine or ammonia complex exhibits a deep blue color. This color persists during the course of the reduction but is observed to vanish upon the addition to the ammonium chloride, acetone and the like to signify the destruction of the reducing potential of the medium. The temperature of the reaction will vary depending upon the particular amine component employed in the reducing medium. As a general rule the temperature of reaction will not be permitted to exceed the boiling point of the amine component. When liquid ammonia is employed for example the temperature of the reaction may vary from —10° C. to —60° C. while with the employment of an aliphatic amine such as ethylamine the reaction temperature may vary from —20° C. to room temperature i.e. 20–30° C.

While a few representative primary or secondary amine components of the reducing medium are disclosed in the several examples of the process set forth below it is to be understood that any aliphatic amine except those having a hydroxyl function such as ethanolamine or hydroxylamine may be employed in the process of this invention. Primary or secondary amines may be employed such as methylamine, dimethylamine, ethylamine, propylamine, butylamine, diethylamine, ethylmethylamine, secondary butylamine, isopropylamine, cyclohexylamine, dodecylamine, hexadecylamine, octylamine, also secondary amines like ethylenediamine, propylene diamine, butylenediamine, and the like.

As stated above the preferred metals employed are lithium and calcium. However, other alkali metals or alkaline earth metals where found suitable may also be employed in the process. The reduction potential quenching agent likewise may be selected from among a large number of compounds illustrated by acetone, ammonium chloride, bromobenzene, iodobenzene, and the like substances, the only requirement of these substances being that they remove the reducing potential of the system.

Although the concept of the invention will be illustrated by the several following embodiments of the invention set forth as specific examples of reductions of a few representative dienones it is not to be construed that these disclosures are intended to represent the scope of our discovery. For a definition of the proper scope of the invention reference must be had to the several appended claims.

In addition to the utilities disclosed hereinabove for our novel reduction process it is also now possible by means of a modification of our above illustrated method to introduce into the steroid nucleus various functional groups derived from electrophilic reagents which may be caused to react with the steroid in its course of reduction. This is achieved by adding to the steroidal $\Delta^{1,4}$-dienone undergoing reduction a reagent such as methyl iodide, or the like. The resultant product derived therefrom is a 2-position substituted monoenone. A particular instance of this would be the preparation of 2-methyl prednisolone. For example reaction of 17α,20;20,21-bismethylenedioxy-1,4-pregnadiene-11β-ol-3-one with lithium-liquid ammonia followed by addition of methyl iodide to the reaction mixture affords 2α-methyl hydrocortisone thereof. If desired, one may add ammonium chloride also to destroy any residual reducing potential of the medium if such is not completely removed by the alkyl halide. Oxidation with selenium dioxide results in the formation of 2-methyl-17α,20;20,21 - bismethylenedioxy - 1,4-pregnadiene-11β-ol-3-one which may be transformed by conventional means to 2-methyl prednisolone.

EXAMPLE 1

*17α,20;20,21-Bismethylenedioxy-4-Pregnene-11β-Ol-3-One*

Collect 400 mls. of liquid ammonia in a nitrogen flushed, dry 2 liter flask equipped with a Hershberg stirrer and surrounded by an outside cooling bath maintained at a temperature of —40° to —60° C. Add lithium metal (0.5 gram) in small chunks with constant stirring. After twenty minutes of vigorous stirring add a solution (cooled to 20° C.) of 1 gram of 17,20;20,21-bismethylenedioxy prednisolone in 110 mls. of nitrogen flushed dry tetrahydrofuran rapidly thru an addition funnel to the deep blue stirred solution. Maintain vigorous stirring for an additional minute and then add solid ammonium chloride until the blue color of the solution is destroyed. Air dry the reaction solution to a solid residue which is triturated with 1 liter of water and filtered to obtain a total yield of crude product of 0.98 gram.

Crystallization of this crude product from acetone affords 0.6 gram of the product of this example, M.P. 220–223° C. $[\alpha]_D+28°$ (CHCl$_3$).

EXAMPLE 2

*9α - Fluoro - 16α - methyl - 17α,20;20,21-Bismethylenedioxy-4-Pregnene-11β-Ol-3-One—9α-Fluoro-16α-Methyl-17α,20;20,21 - Bismethylenedioxy-1,4-Pregnadiene-11β-Ol-3-One*

(A) Suspend 9α-fluoro-16α-methylprednisolone (50 grams) in 2 liters of chloroform. Add to this stirred mixture 500 mls. of formalin and 500 mls. concentrated hydrochloric acid. Maintain stirring for 24 hours. Separate the two phases which appear. Dilute the acid phase with 20 volumes of water and extract twice with 500 mls. portions of chloroform. Combine the chloroform phases and wash twice with 500 ml. portions of water and once with a 5% sodium carbonate solution and finally with 200 mls. of water. Concentrate the chloroform layer and add hexane to afford 9α-fluoro-16α-methyl-17α,20;20,21-bismethylenedioxy-1,4-pregnadiene-11β-ol-3-one.

*9α-Fluoro-16α-Methyl-17α,20;20,21-Bismethylenedioxy-4-Pregnene-11β-Ol-3-One*

(B) Collect 400 mls. of liquid ammonia in a nitrogen flushed dry 2 liter flask equipped with a Hershberg stirrer and surrounded by an outside cooling bath maintained at a temperature of —40° to —60° C. Add lithium metal (0.5 gram) in small chunks with constant stirring. After twenty minutes of vigorous stirring add a solution (cooled to —20° C.) of 1 gram of 9α-fluoro-16α-methyl-17α,20; 20,21-bismethylenedioxy-1,4-pregnadiene-11β-ol-3-one in 160 mls. of nitrogen flushed dry tetrahydrofuran rapidly through an addition funnel to the deep blue stirred solution. Maintain vigorous stirring for an additional minute and then add solid ammonium chloride until the blue color of the solution is destroyed.

Remove the cooling bath and allow the ammonia to evaporate. Add one liter of water to the remaining mixture and extract the aqueous phase with three 200 ml. portions of methylene chloride. Wash the organic phase once with 100 mls. of water and after drying over magnesium sulfate, concentrate to a solid residue.

Crystallize this residue from a solution of crude in acetone to afford 0.72 gram of the product of this example. M.P. 310° C. $[\alpha]_D+6.7$ (pyridine) $E_{239}$ 15,900.

EXAMPLE 3

*9α-Fluoro-11β-Hydroxy-Testosterone*
*9α-Fluoro-11β-Hydroxy-1,4-Androstadiene-3,17-Dione*

(A) Add 9α - fluoro - 11β-hydroxy-prednisolone (1.0 gram) to a suspension of 18 grams of sodium bismuthate in 60 mls. of (1:1) aqueous acetic acid. Stir the mixture at room temperature overnight and dilute with 400 mls. of water. Add potassium hydroxide until the pH is adjusted to approximately 7.5–8.0. Extract the resulting suspension with methylene chloride. After back extracting the organic phase with water evaporate to a solid residue. Crystallize from acetone-hexane to obtain the intermediate of this part of the example.

(B) *9α-Fluoro-11β-Hydroxy-Testosterone*

Collect 200 mls. of liquid ammonia in a nitrogen flushed, dry 1 liter flask equipped with a Hershberg stirrer and condenser. Add calcium (0.3 gram) in small portions to the liquid ammonia. Allow the mixture to stir for 40 minutes and add a solution of 9α-fluoro-11β-hydroxy-1,4-androstadiene-3,17-dione (0.5 gram) prepared above in this example, in 200 mls. of tetrahydrofuran rapidly within one minute. Stir the blue colored reaction mixture an additional 5 minutes. Destroy the blue color by the dropwise addition of acetone. Air evaporate the reaction solution to a solid residue which is triturated with 1 liter of water and then filtered. Dissolve the insolubles in methylene chloride, wash with water, dry over magnesium sulfate and filter.

Concentrate the filtrate with addition of hexane until crystallization occurs, to yield 0.27 gram of the product of this example.

EXAMPLE 4

*Testosterone*

Collect 200 mls. of liquid ammonia in a nitrogen flushed, dry 1 liter flask equipped with a Hershberg stirrer, condenser and an outside cooling bath maintained at —40° to —60° C. Add lithium metal (1 gram) portionwise to the stirred liquid ammonia and maintain stirring for an additional 20 minutes. Through an addition funnel add rapidly a solution of 1,4-androstadiene-3,17-dione (2.0 g.) contained in dry ether (100 mls.). Allow an additional minute and then add ammonium chloride rapidly with constant stirring to dissipate the blue color. Evaporate the reaction solution solvents. Add water to the residue of this evaporation and separate the water insolubles therefrom. Dissolve these in methylene chloride which after washing with water is dried to remove the solvent. Concentrate this product by continuous displacement with hexane to obtain the compound of this example. M.P. 155° C.

EXAMPLE 5

Testosterone

Dissolve 0.5 gram of 1,4-androstadiene-3,17-dione in 30 mls. of anhydrous ethylamine and the solution chilled to 10° C. Add 0.25 gram of lithium metal to the vigorously stirred solution at 10° C. until the deep blue color persists. After a brief period add solid anhydrous ammonium chloride until the blue color is destroyed. Dilute with ice water and extract with ether. Upon evaporation of the organic phase and crystallization from acetone-hexane there is afforded testosterone identical to that obtained in the preceding example.

EXAMPLE 6

9α - Fluoro-16β-Methyl-17α,20;20,21-Bismethylenedioxy-4 - Pregnene - 11β - Ol - 3 - One—(A) 9α-Fluoro-16β-Methyl - 17α,20;20,21 - Bismethylenedioxy-1,4-Pregnadiene-11β-Ol-3-One In a manner similar to that outlined in Example 2(A), 9α-fluoro-16β-methyl prednisolone (50 grams) is converted to 9α-fluoro-16β-methyl-17α,20;20,21-bismethylenedioxy-1,4-pregnadiene-11β-ol-3-one.

(B) Treatment of the compound of part A of this example with lithium metal in liquid ammonia in the manner expressed in Example 2(B) affords the compound of this example.

EXAMPLE 7

Progesterone

Chill a solution of 1,4,16-pregnatriene-3,20-dione (1.0 gram) dissolved in 100 mls. of dry tetrahydrofuran and flushed with nitrogen to approximately −20° C. Add the chilled solution rapidly to 400 mls. of a liquid ammonia-lithium solution prepared as in Example 1, through an addition funnel while vigorously stirring. The addition time is approximately two minutes. Add bromobenzene dropwise to dissipate the blue color of the solution. Evaporate the reaction solution to an oily residue which is diluted with 200 mls. of water and extract with methylene chloride. Dry the organic phase over magnesium sulfate by evaporation. Crystalize the solid residue from ether-hexane to give the compound of this example.

EXAMPLE 8

Corticosterone 21-Acetate

Dissolve a solution of 1,16-bisdehydrocorticosterone 21-acetate (1.0 gram) in 100 ml. of dry tetrahydrofuran. Flush with nitrogen and chill to approximately −20° C. Add the chilled solution rapidly to approximately 400 ml. of liquid ammonia-lithium solution prepared as described in Example 1. The addition is made through an addition funnel while maintaining vigorous stirring during a period of about 95 seconds. After an additional two minutes add solid ammonium chloride to dissipate the blue color. Air dry the reaction solution to a solid residue to which is added an aqueous tetrahydrofuran (1:4) solution (100 ml.) containing 150 mg. potassium hydroxide. The mixture is stirred at room temperature for 15 minutes. Dilute it with 500 ml. of water and extract with methylene chloride. Evaporate this solution to afford a solid residue. Add to this residue 5 ml. pyridine and 0.5 ml. acetic anhydride. Allow the reaction solution to remain at room temperature for 7 hours and then dilute with 100 ml. of water. Extract the resulting mixture with methylene chloride. Evaporation of the organic solvent and crystallization from acetone-hexane affords the compound of this example.

We claim:

1. A process for preparing a 3-keto-$\Delta^4$-steroid which comprises reacting a 3-keto-$\Delta^{1,4}$-steroid with an anhydrous reducing medium comprising a metal selected from the group consisting of an alkali and an alkaline earth metal having an atomic weight less than 41, and a solvent selected from the group consisting of lower primary aliphatic amines, lower secondary aliphatic amines, and ammonia.

2. A process according to claim 1 wherein the metal component of the anhydrous reducing medium is lithium.

3. A process according to claim 1 wherein the solvent is liquid ammonia.

4. A process according to claim 1 wherein the metal component of the anhydrous reducing medium is lithium and the solvent compound is liquid ammonia.

5. A process for preparing a 3-keto-$\Delta^4$-steroid which comprises reacting a 3-keto-$\Delta^{1,4}$-steroid with an anhydrous reducing medium comprising a metal selected from the group consisting of an alkali and an alkaline earth metal having an atomic weight less than 41, and a solvent selected from the group consisting of lower primary aliphatic amines, lower secondary aliphatic amines, and ammonia; and adding a reduction-potential quenching agent selected from the group consisting of acetone, ammonium chloride, bromobenzene and iodobenzene.

6. A process according to claim 5 wherein the substance which destroys the reduction potential is ammonium chloride.

7. A process according to claim 5 wherein the metal component of the anhydrous reducing medium is lithium, the solvent is liquid ammonia and the reduction potential quenching agent is ammonium chloride.

References Cited in the file of this patent

Bowers et al.: J.A.C.S., 82, 4956–4959 (1960).